(12) United States Patent
Watanabe et al.

(10) Patent No.: US 9,597,858 B2
(45) Date of Patent: Mar. 21, 2017

(54) METHOD FOR MANUFACTURING TOUCH PANEL AND MOLDED ARTICLE

(71) Applicants: PANAC CO., LTD., Tokyo (JP); NIDEK CO., LTD., Gamagori-shi, Aichi (JP); WONDER FUTURE CORPORATION, Yokohama-shi, Kanagawa (JP)

(72) Inventors: Takashi Watanabe, Fujinomiya (JP); Hayato Agata, Fujinomiya (JP); Tokuyoshi Kawai, Gamagori (JP); Naohide Isogai, Gamagori (JP); Shigehiro Koide, Gamagori (JP); Akira Sato, Tokyo (JP)

(73) Assignees: PANAC CO., LTD., Tokyo (JP); NIDEK CO., LTD., Aichi (JP); WONDER FUTURE CORPORATION, Kanagawa (JP)

( * ) Notice: Subject to any disclaimer, the term of this patent is extended or adjusted under 35 U.S.C. 154(b) by 0 days.

(21) Appl. No.: 14/772,636

(22) PCT Filed: Feb. 25, 2014

(86) PCT No.: PCT/JP2014/054437
§ 371 (c)(1),
(2) Date: Sep. 3, 2015

(87) PCT Pub. No.: WO2014/136608
PCT Pub. Date: Sep. 12, 2014

(65) Prior Publication Data
US 2016/0009056 A1 Jan. 14, 2016

(30) Foreign Application Priority Data

Mar. 4, 2013 (JP) ................. 2013-041417

(51) Int. Cl.
*B29C 45/14* (2006.01)
*B32B 7/06* (2006.01)
(Continued)

(52) U.S. Cl.
CPC ............ *B32B 7/06* (2013.01); *B29C 37/0025* (2013.01); *B29C 45/14811* (2013.01);
(Continued)

(58) Field of Classification Search
None
See application file for complete search history.

(56) References Cited

U.S. PATENT DOCUMENTS 5,965,256 A * 10/1999 Barrera ................. B05D 5/083
427/407.1
2006/0132945 A1 6/2006 Sano
2010/0103138 A1 4/2010 Huang et al.

FOREIGN PATENT DOCUMENTS

CN 1336559 A 2/2002
CN 1932639 A 3/2007
(Continued)

OTHER PUBLICATIONS

International Search Report of PCT/JP2014/054437 dated Jun. 3, 2014 [PCT/ISA/210].
(Continued)

*Primary Examiner* — Edmund Lee
(74) *Attorney, Agent, or Firm* — Sughrue Mion, PLLC

(57) ABSTRACT

An object of the present invention is to provide a method for manufacturing a touch panel. A laminated film is used. The laminated film comprises a resin layer, a protection film-constituent material layer provided on a surface of the resin layer, and a releasing layer provided on a surface of the protection film-constituent material layer. The protection film-constituent material layer is a layer containing fluorine-
(Continued)

based substances. The releasing layer is a layer made by using a fluorine-based resin. The method comprises a molding process, a hardening treatment process for providing hardening treatment to the protection film-constituent material layer after the molding process, and a removal process for removing the releasing layer after the molding process. The protection film-constituent material layer is an uncured layer in the course of a molding process.

18 Claims, 5 Drawing Sheets

(51) Int. Cl.
  G06F 3/044    (2006.01)
  B32B 27/08    (2006.01)
  B32B 27/30    (2006.01)
  B32B 27/32    (2006.01)
  B32B 27/36    (2006.01)
  B29C 37/00    (2006.01)
  B29C 45/16    (2006.01)
  B29C 45/26    (2006.01)
  B32B 23/08    (2006.01)
  B29K 627/12   (2006.01)
  B29L 31/34    (2006.01)
  B29K 33/00    (2006.01)
  B29L 9/00    (2006.01)

(52) U.S. Cl.
  CPC .............. *B29C 45/16* (2013.01); *B29C 45/26* (2013.01); *B32B 23/08* (2013.01); *B32B 27/08* (2013.01); *B32B 27/302* (2013.01); *B32B 27/308* (2013.01); *B32B 27/32* (2013.01); *B32B 27/322* (2013.01); *B32B 27/365* (2013.01); *G06F 3/044* (2013.01); *B29K 2033/08* (2013.01); *B29K 2627/12* (2013.01); *B29K 2995/007* (2013.01); *B29L 2009/00* (2013.01); *B29L 2031/3475* (2013.01); *B32B 2307/206* (2013.01); *B32B 2307/412* (2013.01); *B32B 2307/748* (2013.01); *B32B 2457/208* (2013.01); *G06F 2203/04103* (2013.01)

(56) References Cited

FOREIGN PATENT DOCUMENTS

| | | |
|---|---|---|
| CN | 102207681 A | 10/2011 |
| JP | 62-176814 A | 8/1987 |
| JP | 6-15179 B2 | 3/1994 |
| JP | 08-150636 A | 6/1996 |
| JP | 2004-361835 A | 12/2004 |
| JP | 2006-344163 A | 12/2006 |
| JP | 2009-130283 A | 6/2009 |
| JP | 2010-052334 A | 3/2010 |
| JP | 2010-146418 A | 7/2010 |
| JP | 2010-228391 A | 10/2010 |
| JP | 2011-044933 A | 3/2011 |
| JP | 2011-131410 A | 7/2011 |
| JP | 2011-161692 A | 8/2011 |
| JP | 2011-213989 A | 10/2011 |
| JP | 2012-053644 A | 3/2012 |
| JP | 2012-208857 A | 10/2012 |
| JP | 2012-210755 A | 11/2012 |
| JP | 2012-250438 A | 12/2012 |
| TW | 201300884 A1 | 1/2013 |
| TW | 201307073 A | 2/2013 |
| TW | 201307909 A | 2/2013 |

OTHER PUBLICATIONS

Communication dated Mar. 14, 2016 from the State Intellectual Property Office of the P.R.C. in counterpart Application No. 201480012308.6.
Chinese Office Action with Search Report for corresponding Application No. 201480012308.6 issued Dec. 26, 2016.
Taiwanese Office Action for corresponding Application No. 103106692.

* cited by examiner 16 14 15 19 10 1 6 3

16 14 15 19 10 1 6

METHOD FOR MANUFACTURING TOUCH PANEL AND MOLDED ARTICLE

CROSS REFERENCE TO RELATED APPLICATIONS

This application is a National Stage of International Application No. PCT/JP2014/054437, filed Feb. 25, 2014, claiming priority based on Japanese Patent Application No. 2013-041417, filed Mar. 4, 2013, the contents of all of which are incorporated herein by reference in their entirety.

TECHNICAL FIELD

The present invention relates to a molded body and a film to be used in molding.

BACKGROUND ART

An apparatus using a touch panel (e.g., information terminal (e.g., digital camera, digital video camera, cellular phone) or an information terminal for vehicles (e.g., car navigation device), and other information devices) are widely used.

In such apparatus, the touch panel works as, for example, an input device. The touch panel is mounted to a display device (e.g., liquid crystal display device). Input operation is performed by touching (contacting/approaching) a predetermined portion (contents display portion) of the touch panel. There is such another type of touch panel that an inputting can be performed by only bringing, for example, an input tool (e.g., touch pen) or a finger (human finger) close to the touch panel.

Touch panels are classified into a resistive touch panel and an electrostatic capacitive touch panel. In the electrostatic capacitive touch panel, sensing electrodes are provided on a display screen (operation screen) along a two dimensional direction (in an x-direction and a y-direction in an x-y coordinate system). Each sensing electrode is made of a transparent conductive material (e.g., ITO (Indium Tin Oxide)). A space between neighboring sensing electrodes is connected via a transparent conductive material having a predetermined pattern. Further, a lead-out circuit pattern is connected thereto. The touch panel having the above described structure is already publicly known, and thus a detailed description thereof is omitted here.

Input operation is performed by a touching operation to touch the touch panel. This means that a finger frequently touches the touch panel. This causes sticking of stains (finger prints, finger marks, etc.) on a surface of the touch panel. Therefore, transparency of the surface of the touch panel degrades. In order to avoid degrading of transparency, it is proposed to provide a water repellent and oil repellent protection film on the surface of the touch panel. It is said that the protection film preferably has a high hardness, a scratch resistance, an abrasion resistance, and a surface lubricating property.

Application of constituent material of the protection film onto the surface of the touch panel (touch panel as a molded article) forms the protection film on the surface of the touch panel (Method A). This Method A has a problem in productivity. That is, the touch panel manufactured by the Method A had a problem in quality.

The touch panel is formed in a manner that the constituent material of the protection film is applied to a touch panel constituent material (film) to form a film on the touch panel (Method B). According to the Method B, the touch panel as a final product has already provided with the protection film on the surface of the touch panel. Therefore, manufacturing cost can be saved with the Method B.

Proposed (available) examples of the constituent material of the protection film include organic hard coating agents, inorganic hard coating agents, and organic-inorganic composite hard coating agents. The organic-inorganic composite hard coating agents are placed in market from NIDEK CO., LTD., JSR CORPORATION, Nitto Boseki Co., Ltd., DIC CORPORATION, etc.

To achieve size reduction of the information terminal, it is proposed that a size of a display screen of the information terminal is accorded as much as possible with a size of an operation screen of the touch panel. Further, it is proposed that a size of an area (frame region) including a lead-out circuit pattern connected to sensing electrodes formed thereon is reduced as much as possible. For example, it is considered that the lead-out circuit pattern is formed on, for example, a side surface approximately perpendicular to the operation screen (touch panel surface/principle surface) of the touch panel.

There are many reports on touch panel. The following is one example thereof.

Patent Literature 1 includes the following description. "In organic-inorganic composite-hard coating resin compositions, a hard coating material is metallic oxide fine particles modified with polyfunctional (meth)acrylate monomer-modifying modifier obtained by sulfide bonding (—R—S—R'—: R and R' are aliphatic group and/or aromatic hydrocarbon group) of the thiol group of silane coupling agent containing thiol group and an acryloyl group and/or a methacryloyl group of tri- or higher functional (meth)acrylate monomer, and a hard coating resin composition further includes bi- or lower functional acrylate monomer and/or fluororesin, and further photoinitiator."

Patent Literature 2 includes the following description. "A hard coating film according to claim 1 is a hard coating film including at least a plastic film as a base material and a hard coat layer laminated on at least one surface of the plastic film, wherein the plastic film is an acrylic resin film, and wherein the hard coat layer is formed of resin prepared by mixing organic-inorganic hybrid type resin and an additive of a fluorine-based compound."

Patent Literature 3 includes the following description. "A method for manufacturing a colored resin molded product includes a step of molding a composite layer composed of an uncured or semi-cured permeable hard coat layer provided on an upper side of a colored resin layer and a mold parting film provided right above the hard coat layer by using a die, a step of detaching a molded article from the die to thereafter peel off the mold release film from the molded article, and a step of completely curing the hard coat layer before or after the peel-off of the mold release film, wherein the step of molding the composite layer by using the die includes a step of previously molding a laminate composed of at least the hard coat layer and the mold parting film, a step of setting the laminate in the die so as to cause the mold parting film to contact the die, and a step of injecting a colored resin into the die of a side of the hard coat layer of the laminate to cause the colored resin to be integrated with the hard coat layer as well as to cause thus obtained integrated material being molded into a desired shape."

Patent Literature 4 includes the following description. "As shown in FIG. 1, an in-mold shaping-hard coat film 1 of the present invention has such a configuration that a hard coating layer 20 is laminated on a surface of a substrate film 10. . . . As shown in FIG. 2, a protection film 30 is laminated on the hard coat layer 20 to thereby form an in-mold shaping-hard coat film 2. . . . As shown in FIG. 3, a print layer 40 is formed on the substrate film 10 to form an in-mold label 3. It is not necessary to laminate the protection film 30 on the hard coat layer 20." "The in-mold shaping-hard coat film of the present invention is formed in a manner that materials composing the hard coat layer are mixed and a solvent is added thereto, and, thereafter, the resulting mixture is applied to a surface of the substrate film. Then, the solvent is evaporated and exposed to ultraviolet rays to harden it, thereby forming the hard coat layer. . . . The protection film can be laminated on one surface or both surfaces of the hard coat film that was formed by the irradiation of ultraviolet."

Patent Literature 5 includes the following description. "As shown in FIG. 1, a method of processing a hard coat film according to an embodiment includes a step of attaching a protective film 30, the protective film 30 including a base film 31 and an adhesive layer 32 formed on one surface of the base film 31, to a surface of a hard coat layer 20 of a hard coat film which is composed of a substrate 10 and the hard coat layer 20 formed on the substrate 10 (see, FIGS. 1(a) and 1(b)) and a step of processing the resulting laminate under the circumstance."

Patent Literature 6 includes the following description. "A sixth invention is directed to a method for forming a hard coat film for molding which includes a hard coat layer produced by applying and curing a coating liquid on at least one surface of a base material film, wherein the method includes a step of attaching a protective film made of a polypropylene film to at least one surface of the hard coat film for molding and a subsequent step of molding the resulting film."

Patent Literature 7 includes the following description. "A decorative sheet 10 of the present invention illustrated in FIG. 1 is formed in a manner that a release layer 12, a hard coat layer-forming layer 13, an anchor layer 14, a pattern layer 15, and an adhesive layer 16 are laminated in this order on one surface of a substrate film 11 made of a polyester film." "The decorative sheet having the release layer 12 of the present invention ensures transfer of a transfer layer 17 from the decorative sheet to an objective transfer body with ease, and a peel-off layer 18 composed of the substrate film 11 and the release layer 12 can be separated for sure." "The method of manufacturing a decorative molding of the present invention includes a process (1) of arranging a decorative sheet on one side surface of the substrate film in a mold for injection molding, the decorative sheet including at least a release layer and a hard coat layer forming layer formed thereon in this order, the hard coat layer forming layer being formed by applying an ink composition on the hard coat layer having ionizing radiation hardenability, an injection process (2) of injecting a molten resin into a cavity and cooling and solidifying the resin to laminate and integrate the resulting resin molding and the decorative sheet together, a process (3) of taking out the molding from the mold after the resin molding and the decorative sheet are formed into one piece, a process (4) of releasing the substrate film of the decorative sheet from the molding, and a hard coat layer molding process (5) of hardening the hard coat layer forming layer formed on the molding in an atmosphere of an oxygen concentration equal to or less than 2%."

Patent Literature 8 includes the following description. "A laminate hard coat film 1 for molding of the present invention illustrated in FIG. 1 includes a hard coat layer 12 formed on a base material film 11 and a protective film 13 formed on the hard coat layer 12." "The present invention is directed to provide also a suitable method for manufacturing the laminate hard coat film 1 for molding. The suitable method includes forming a hard coat layer 12 by coating and drying a coating material composition containing at least an active energy ray-curing type resin and a polymerization initiator, on one surface of the base material film 11 (step 1), irradiating active energy rays of a total exposure amount equal to or less than 50 mJ/cm$^2$ to the hard coat layer 12 as required (step 2), and, subsequently, laminating the protective film 13 on the hard coat layer 12 of a side opposite to the base material film 11 (step 3)." "In the above described step 2, the active energy rays are irradiated to the coated hard coat layer 12 by the total exposure amount equal to or less than 50 mJ/cm$^2$. This slightly improves cross-linking of the active energy ray-curing type resin contained in the hard coat layer 12 to cause the hard coat layer 12 to be placed in a semi-cured state." "The present invention provides also a method for manufacturing a resin molded article by using the above described laminate hard coat film for molding. More specifically, the method for manufacturing a resin molded article includes forming a decorative film, as required, by printing, etc. on the laminate hard coat film 1 (step A), subsequent preheating of the laminate hard coat film 1 (step B), manufacturing a resin molded body formed in a manner that the laminate hard coat film 1 and a resin material are molded and, simultaneously, formed into one piece by molding (step C), and followed by performing post-exposure by means of active energy rays with respect to the laminate hard coat film 1 integral with the resin molded body (step D)." "In the above described step D, the post-exposure is performed by irradiating active energy rays to the laminate hard coat film 1 integral with the resin molded body. This post-exposure causes the hard coat layer 12 to completely cure.

Patent Literature 9 includes the following description. "FIG. 1 is a cross sectional view of an electrostatic capacitance touch panel 1 of the present invention. In FIG. 1, the electrostatic capacitance touch panel 1 includes an insulative transparent substrate 1a formed thereon with a sheet shaped-conductive part 1b as an electrode, the sheet shaped-conductive part 1b being formed of thin metallic wires and having a mesh structure in a part requiring transparency. . . . A metal film made of, for example, silver, copper, aluminum, gold, nickel, and stainless steel is employed as a material of the conductive part (electrode) 1b to form a conductive pattern thereon."

Patent Literature 10 includes the following description. "A conductive sheet including a transparent substrate and a conductive pattern formed on a principle surface of the transparent substrate, the conductive pattern being formed of a thin wire of which line width is a range between 0.1 and 25 μm" "A method for manufacturing a conductive sheet"

Patent Literature 11 includes the following description. "A touch panel usable for a narrow frame, wherein a touch panel is formed into a three-dimensional shape having a surface and side faces, wherein a touch position detecting surface is formed on a surface of the touch panel for the purpose of detecting a touch position, wherein an electrode and a read circuit for connecting the electrode to an external output section are formed on a side face of the touch panel, and wherein the surface of the touch panel is disposed on a surface of a LCD, and the side faces of the touch panel are disposed on side faces of the LCD, respectively."

Patent Literature 12 includes the following description. "A cellular phone including an input section disposed on a side surface (side surface input section)" "The side surface input section is composed of a flexible printed wiring board and a plurality of sensing electrodes, and the side surface input section is mounted to the side surface via a plurality of sensing electrodes of a touch sensor."

Patent Literature 13 includes the following description. "The present invention is directed to a method for manufacturing a surface panel in which a translucent resin layer and a detection film for detecting approach of a human finger are laminated together, the method including a step of disposing, with the use of a first die having a concave portion and a second die having a convex portion, a pre-molded detection film between the first die and the second die, the pre-molded detection film being provided with a translucent electrode layer and a wiring layer connected to the translucent electrode layer formed on a back surface of the pre-molded detection film and provided with a decorative part for covering the wiring layer formed on a surface of the pre-molded detection film, respectively, a step of closing the first die and the second die to form a cavity for receiving the detection film between the concave portion and the convex portion, and a step of molding a translucent resin layer by injecting molten resin into the cavity, molding a surface and a right side surface and a left side surface of which surface shapes change backwardly from the surface in a rightward direction and a leftward direction in the concave portion, molding a rear surface which is the other side of the surface, and a right side rear surface and a left side rear surface which are the other side of the right side surface and the other side of the left side surface, respectively, in the convex portion, and closely contacting the detection film on a rear side of the resin layer to cause the electrode layer to be positioned on the rear surface and to cause the wiring layer to be positioned at least one of the right side rear surface and the left side rear surface." "According to the method for manufacturing the surface panel of the present invention, the detection film can be tightly attached to the resin layer with only a step of placing unmolded detection film in the die and injecting molten resin into the die." "As illustrated in FIG. 4 and FIG. 5, a touch sensor unit 30 provided on a detection film 5 includes a plurality of electrode layers 31, a plurality of right side wiring layers 32a each connected to a right side of the corresponding electrode layers 31, and a plurality of left side wiring layers 32b each connected to a left side of the corresponding electrode layers 31. As shown in FIG. 4 and FIG. 7 (a plane transparent view illustrating a pattern of each electrode layer disposed on a rear surface of the touch panel film when it is seen from a surface of the touch panel film), each electrode layer 31 is positioned in a transparent area 7 enclosed by a frame-shaped decorative section 6, and right side wiring layers 32a and the left side wiring layers 32b are formed at positions hidden in a rear side of the decorative section 6." "The method for manufacturing the surface panel 1 of the present invention is not limited to the above described embodiment. In the method, for example, it is possible to preform the detection film 5 in a manner that the detection film 5 is shaped following a shape of a rear side 3 of a resin layer 4 by means of pressure forming or vacuum forming, to insert the preformed detection film 5 into the die, and to inject the molten resin 4a into the die."

Patent Literature 14 includes the following description. "A method for manufacturing an outer case for an electronic apparatus of the present invention includes a first step of forming a first film which is formed into the outer case and includes a display section, a second step of forming a flexible second film with a conductive pattern including an electrode section which works for the display section, and a third step of forming a base made of synthetic resin between the first film and the second film to cause the base to be integral with the first film and the second film."

BACKGROUND ART

Citation List

Patent Literature 1
JP2011-213989A (claims 6 and 7, and [0028])
Patent Literature 2
JP2012-250438A ([0010])
Patent Literature 3
JP1996-150636A ([0006] and [0021])
Patent Literature 4
JP2010-52334A ([0012] to [0015], and [0039])
Patent Literature 5
   JP2010-228391A ([0011])
Patent Literature 6
JP2011-131410A ([0012])
Patent Literature 7
JP2011-161692A ([0024], [0026], and [0036])
Patent Literature 8
JP2012-210755A ([0022], [0038], [0041], [0045], and [0049])
Patent Literature 9
JP2006-344163A ([0020] to [0023]
Patent Literature 10
JP2012-53644A ([0011] and [0055] to [0103])
Patent Literature 11
JP2010-146418A ([0019] and [0024] to [0042])
Patent Literature 12
JP2011-44933A ([0011] to [0019] and [0035])
Patent Literature 13
JP2012-208857A ([0018], [0019], [0039], [0040], and [0085])
Patent Literature 14
JP2009-130283A ([0016])

SUMMARY OF INVENTION

Technical Problem

With regard to a method for forming a protection film, attention was paid to the method B since the method A was degraded in productivity. However, the following problem was seen in the method B. In the protection film, a high degree of hardness, scratch resistance, abrasion resistance, and surface lubricating property are also required in addition to antifouling property (water repellency and oil repellency). More specifically, the high degree of hardness was demanded for the protection film. However, it is difficult to shape a film with a hard protection film formed thereon (two-dimensional film) into a shape of a touch panel (case shape/box-shape/three-dimensional shape). This is because, existence of the hard protection film leads to easy occurrence of cracks in the protection film while forming the protection film by molding.

It was proposed to form a touch panel by forming a laminated film (resin film/hard protection film/releasable film) composed of a resin film (base material), a hard protection film, and a releasable film. In other words, the releasable film was provided between a die and the protection film in order to avoid occurrence of cracks in the protection film due to a force applied in molding process. However, even with the releasable film, it was impossible to prevent the hard protection film from getting cracked.

It is proposed that a film composed of an uncured (or semi-cured) protection film and a releasable film provided on the uncured (or semi-cured) protection film is formed into a touch panel by molding (Patent Literature 3). The inventors of the present application performed further experiments with respect to this technical concept.

Specifically, a coating film (protection film) was provided on a surface of a resin film (base material). The coating film is cured by heating (and/or photo-irradiation). However, hardening (heating and/or photo-irradiating) treatment is not performed at this stage. Without the hardening treatment, the releasable film was provided on the coating film (protection film). A lamination of the resin film, the coating film (protection film), and the releasable film was subjected to molding. After the molding, a molded article (touch panel) was taken out from a die. The coating film (protection film) of thus taken out touch panel was subjected to hardening treatment. After the hardening treatment, the releasable film was peeled off from the molded article. Thus obtained touch panel was not satisfactory in every case.

In repeating such experiments, the present inventors came to know there is a large difference in quality of the resulting touch panel according to difference in selection of protection film and releasable film. Accordingly, the present invention was achieved.

In sum, a purpose of the present invention is to provide a high quality molded article with ease and at low cost.

Solution to Problem

The present invention proposes a method for manufacturing a touch panel by molding a laminated film:
wherein the laminated film includes
a resin layer,
a protection film-constituent material layer provided on a surface of the resin layer, and
a releasing layer provided on a surface of the protection film-constituent material layer;
wherein the resin layer, the protection film-constituent material layer, and the releasing layer are laminated together;
wherein the protection film-constituent material layer is an uncured layer which is not completely cured, in the course of a molding process;
wherein the method includes
a molding process,
a hardening treatment process for providing hardening treatment to the protection film-constituent material layer after the molding process and getting the protection film-constituent material layer modified to be a protection layer, and
a removal process for removing the releasing layer after the molding process;
wherein the protection film-constituent material layer is a layer containing fluorine-based substances; and
wherein the releasing layer is a layer made by using a fluorine-based resin.

The present invention proposes the method for manufacturing a touch panel, further including a process of forming a wiring film on a surface of an insulative transparent resin layer by molding, the wiring film being provided with a wiring layer of a predetermined pattern.

The present invention proposes the method for manufacturing a touch panel, further including a molding process A (a process for forming the laminated film by molding), a molding process B (a process for forming the wiring film by molding), and a molding process C (a process for integrating the molded body obtained in the molding process A with the molded body obtained in the molding process B).

The present invention proposes the method for manufacturing a touch panel, wherein a composite film composed of the laminated film and the wiring film is formed by molding.

The present invention proposes the method for manufacturing a touch panel, wherein the protection film-constituent material layer contains a composition curable by hardening treatment.

The present invention proposes the method for manufacturing a touch panel, wherein the protection film-constituent material layer contains a fluorine-based substance and a composition curable by hardening treatment.

The present invention proposes the method for manufacturing a touch panel, wherein the protection layer has a contact angle to oleic acid equal to or greater than 40°.

The present invention proposes the method for manufacturing a touch panel, wherein the protection layer has a contact angle to water equal to or greater than 70°.

The present invention proposes the method for manufacturing a touch panel, wherein the releasing layer is made by using ethylene tetrafluoro ethylene copolymer and/or tetrafluoroetylene-hexafluoropropylen copolymer.

The present invention proposes the method for manufacturing a touch panel, wherein the resin layer is made by using one or more resins selected from the group consisting of acrylic resin, methacrylic resin, ester-based resin, cellulose-based resin, olefin-based resin, carbonate-based resin, and ABS resin.

The present invention proposes the method for manufacturing a touch panel, wherein the removal process is performed after the hardening treatment process.

The present invention proposes the method for manufacturing a touch panel,
wherein the touch panel is an electrostatic capacitive touch panel,
wherein the touch panel includes a case body formed of an electrically insulative transparent resin film,
wherein the case body includes a principal surface portion and side surface portions,
wherein the principal surface portion includes a principal surface input region,
wherein at least one of the side surface portions includes a side surface input region,
wherein the principal surface portion is provided with at least two first electrode rows and at least two second electrode rows,
wherein the at least two first electrode rows are arranged in a first direction at predetermined distances;
wherein the at least two second electrode rows are arranged in a second direction at predetermined distances;
wherein each of the first electrode rows and each of the second electrode rows include at least two island-shaped electrodes and inter-electrode wirings electrically connecting the island-shaped electrodes,
wherein side surface portion including the side surface input region is provided with one or more third electrode rows and one or more fourth electrode rows,
wherein the third electrode rows are arranged on an extension of the first electrode rows (and/or the second electrode rows),
wherein the fourth electrode rows are provided in a direction of the second electrode rows (and/or the first electrode rows),
wherein ends of the first electrode rows or ends of the third electrode rows are electrically connected to one ends of the first lead wirings in each corresponding manner, wherein the other ends of the first lead wirings are formed on a side surface portion without including the side surface input region, wherein ends of the second electrode rows and ends of the fourth electrode rows are electrically connected to one ends of the second leading wirings in each corresponding manner, wherein the other ends of the second lead wirings are formed on the side surface portion without including the side surface input region, and wherein at least one of the first lead wirings and the second lead wirings pass through a ridgeline portion as a boundary between the neighboring side surface portions.

The present invention proposes the method for manufacturing a touch panel, wherein the touch panel is an electrostatic capacitive touch panel, wherein the touch panel is a case body having a principal surface portion, side surface portions, and a hollow portion, wherein the protection layer is provided on at least an outer surface of the case body, wherein the hollow portion is a region defined by the principal surface portion and the side surface portions, wherein the side surface portions are
each continuous to the principal surface portion, and
each approximately orthogonal to the principal surface portion, wherein there are at least four side surface portions each approximately orthogonal to the principal surface portion, wherein at least two side surface portions of the side surface portions are approximately orthogonal to a first direction in the principal surface portion, wherein at least another two side surface portions of the side surface portions are approximately orthogonal to a second direction in the principal surface portion, wherein the principal surface portion includes a principal surface input region, wherein at least one side surface portion of the at least four side surface portions includes a side surface input region, wherein the principal surface portion is provided with at least two first electrode rows and at least two second electrode rows,
wherein the at least two first electrode rows are arranged
at predetermined distances, and
in the first direction,
wherein the at least two second electrode rows are arranged
at predetermined distances, and
in the second direction, wherein each of the first electrode rows and each of the second electrode rows include at least two island-shaped electrodes and inter-electrode wirings electrically connecting the island-shaped electrodes, wherein the at least one side surface portion including the side surface input region is provided with one or more third electrode rows and one or more fourth electrode rows, wherein the third electrode rows are arranged on an extension of the first electrode rows (and/or the second electrode rows), wherein the fourth electrode rows are arranged in a direction of the second electrode rows (and/or the first electrode rows), wherein ends of the first electrode rows or ends of the third electrode rows are electrically connected to one ends of first lead wirings in each corresponding manner, wherein the other ends of the first lead wirings are formed on the side surface portion without including the side surface input region, wherein ends of the second electrode rows and ends of the fourth electrode rows are electrically connected to one ends of second lead wirings in each corresponding manner, wherein the other ends of the second lead wirings are formed on the side surface portion without including the side surface input region, and wherein at least one of the first lead wirings and the second lead wirings pass through a ridgeline portion as a boundary between the neighboring side surface portions.

The present invention proposes the method for manufacturing a touch panel, wherein the first electrode rows are provided on one surface of the principal surface portion, wherein the second electrode rows are provided on the other surface of the principal surface portion, wherein the third electrode rows are provided on a surface where the electrode rows as origins of the third electrode rows are provided, and wherein the fourth electrode rows are provided on a surface where the electrode rows along which the fourth electrode rows are arranged are provided.

The present invention proposes the method for manufacturing a touch panel, wherein the first electrode rows and the second electrode rows are provided on one surface of the principal surface portion, wherein electrically insulative spacers are provided at crossings between the first electrode rows and the second electrode rows, wherein the third electrode rows and the fourth electrode rows are provided on one surface of the side surface portion, and wherein electrically insulative spacers are provided at crossings between the third electrode rows and the fourth electrode rows.

The present invention proposes the method for manufacturing a touch panel, wherein the lead wirings passing through the ridgeline portion are arranged on the inside surface of the case body.

The present invention proposes the touch panel obtained by the method for manufacturing a touch panel.

The present invention proposes the method for manufacturing a molded article by molding a laminated film,
wherein the laminated film includes
a resin layer,
a protection film-constituent material layer formed on a surface of the resin layer, and
a releasing layer formed on a surface of the protection film-constituent material layer, wherein the resin layer, the protection film-constituent material layer, and the releasing layer are laminated together, wherein the protection film-constituent material layer is an uncured layer which is not completely cured in the process of molding, wherein the method includes
a molding process,
a hardening treatment process for providing hardening treatment to the protection film-constituent material layer after the molding process and getting the protection film-constituent material layer modified to be a protection layer, and
a removal process for removing the releasing layer after the molding process, wherein the protection film-constituent material layer contains fluorine-based substances, and wherein the releasing layer is made by using a fluorine-based resin.

The present invention proposes the method for manufacturing a molded article, wherein the protection film-constituent material layer contains composition curable by hardening treatment.

The present invention proposes the method for manufacturing a molded article, wherein the protection film-constituent material layer contains fluorine-based substances and composition curable by hardening treatment.

The present invention proposes the method for manufacturing a molded article, wherein the removal process is performed after hardening treatment process.

The present invention proposes a molded article obtained by the method for manufacturing a molded article.

The present invention proposes a laminated film for obtaining a molded article, wherein the laminated film includes a resin layer, a protection film-constituent material layer formed on a surface of the resin layer, and a releasing layer formed on a surface of the protection film-constituent material layer, wherein the resin layer, the protection film-constituent material layer, and the releasing layer are laminated together, wherein the protection film-constituent material layer is an uncured layer which is not completely cured, wherein the protection film-constituent material layer contains fluorine-based substances, and wherein the releasing layer is a layer made by using a fluorine-based resin.

The present invention proposes the laminated film, wherein the protection film-constituent material layer contains composition curable by hardening treatment.

The present invention proposes the laminated film, wherein the protection film-constituent material layer contains fluorine-based substances and composition curable by hardening treatment.

The present invention proposes the laminated film, wherein the protection layer obtained by curing the protection film-constituent material layer has a contact angle to oleic acid equal to or greater than 40°.

The present invention proposes the laminated film, wherein the protection layer obtained by curing the protection film-constituent material layer has a contact angle to water equal to or greater than 70°.

The present invention proposes the laminated film, wherein the releasing layer is composed of ethylene tetrafluoro ethylene copolymer and/or tetrafluoroetylene-hexafluoropropylen copolymer.

The present invention proposes the laminated film, wherein the resin layer is composed of one or more resins selected from the group consisting of acrylic resin, methacrylic resin, ester-based resin, cellulose-based resin, olefin-based resin, carbonate-based resin, and ABS resin.

Advantageous Effect of Invention

A high quality molded article (e.g., touch panel) can be obtained conveniently and inexpensively.

DESCRIPTION OF EMBODIMENTS

Figure 1:
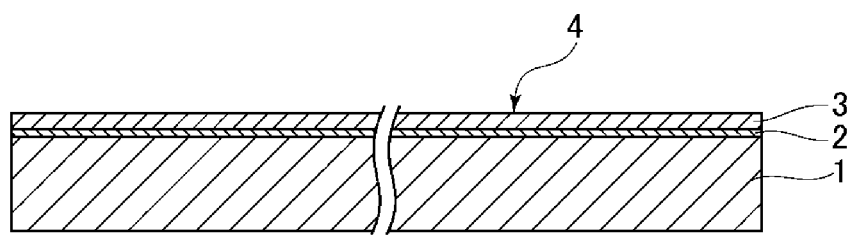
FIG. 1 is a cross sectional view of a laminated film.

An embodiment of the present invention will be described below.

A first invention is directed to a laminated film. The laminated film is a film for obtaining a molded article. The laminated film has a resin layer. Preferably, the resin layer is a transparent resin layer. The resin layer is, for example, an insulative resin layer. The resin layer is, for example, a resin film. The resin layer is, for example, a transparent resin film. The laminated film has a protection film-constituent material layer. The protection film-constituent material layer is provided on one surface (or both surfaces) of the resin layer. The protection film-constituent material layer is an uncured layer, i.e., is not completely cured. The protection film-constituent material layer substantially is not subjected to hardening treatment. For example, the protection film-constituent material layer is an uncured layer. Alternatively, the protection film-constituent material layer is a semi-cured layer. The protection film constituting-material film is not completely cured, and thus is relatively soft. The protection film-constituent material layer contains fluorine-based substances. The laminated film has a releasing layer. The releasing layer is formed on a surface of the protection film-constituent material layer. The releasing layer is a layer made by using a fluorine-based resin. For example, the releasing layer is a film composed of a fluorine-based resin. For example, the releasing layer is a fluorine-based resin film. The resin layer, the protection film-constituent material layer, and the releasing layer are laminated together.

The protection film-constituent material layer is made by applying and drying, for example, a solution (coating) containing the protection film-constituent material. In a process of application and drying, the protection film-constituent material layer has not been completely cured yet. When the protection film-constituent material layer is subjected to hardening treatment, the protection film-constituent material layer is modified to a cured protection layer. The protection film is a completely (almost completely) cured layer. The cured protection layer has a high hardness (preferably, has pencil hardness equal to or greater than 3H). The protection film-constituent material layer contains fluorine-based substances. Preferably, the protection film-constituent material layer contains a composition curable by hardening treatment. Preferably, the protection film-constituent material layer contains fluorine-based substance and a composition curable by hardening treatment. The curable composition is a polymerizable monomer having, for example, a tri- or higher functional group. The fluorine-based substance may be a composition curable by hardening treatment. The composition curable by hardening treatment may be a substance having F. The fluorine-based substance is a fluorine-based resin which is readily obtainable, and the cured composition is a polymerizable monomer having, for example, the tri- or higher functional group. Preferably, the protection film-constituent material layer contains a fluorine-based resin and the polymerizable monomer having, for example, the tri- or higher functional group.

The following materials (substances/compounds) are examples of the protection film-constituent material. The material contains a fluorine-based resin and metal oxide particles modified with, for example, a polyfunctional(meth) acrylic group. The polyfunctional means having tri- or higher functional group. An example of the metal oxide particles modified with the polyfunctional (meth)acrylic group includes metal oxide particles modified with, for example, a polyfunctional methacrylate monomer (e.g., polyfunctional methacrylate monomer resulting from sulfide bonding (—R—S—R'—: R, R' are hydrocarbon groups) between a thiol group of a silane coupling agent (for example, a silane coupling agent having a thiol group) and an acryloyl group and/or methacryloyl group of methacrylate monomer.

Examples of silane coupling agent having a thiol group include (3-mercaptopropyl)trimethoxylsilane, (3-mercaptopropyl)triethoxysilane, (3-mercaptopropyl)methyldimethoxysilane, (3-mercaptopropyl)ethyldimethoxysilane, (1-mercaptomethyl)methyldimethoxysilane, and 11-mercaptoundecyltrimethoxysilane.

Examples of (meth)acrylate monomer include trimethylolpropane trimethacrylate, trimethylolpropane triacrylate, ethylene oxide-modified trimethylolpropane trimethacrylate, ethylene oxide-modified trimethylolpropane triacrylate, pentaerythritol trimethacrylate, pentaerythritol triacrylate, pentaerythritol tetramethacrylate, pentaerythritol tetraacrylate, dipentaerythritol hexa methacrylate, dipentaerythritol hexa-acrylate, tetramethylolmethane trimethacrylate, tetramethylolmethane triacrylate, tetramethylolmethane tetramethacrylate, tetramethylolmethane tetracrylate, tris-(2-hydroxyethyl)isocyanurate trimethacrylate, tris-(2-hydroxyethyl)isocyanurate triacrylate, urethane methacrylate, and urethane acrylate. Another example of (meth)acrylate monomer includes (meth)acrylate having a polyfunctional group (e.g., tri- or higher functional group). As a matter of course, examples of (meth)acrylate monomer are not limited to the above examples. One or more selected from the above groups are used, as required.

Examples of metal oxide particle include $SiO_2$, $Al_2O_3$, $ZrO_2$, $TiO_2$, ITO, $SnO_2$, ZnO, $Sb_2O_3$, and $Sb_2O_5$. As a matter of course, examples of the metal oxide particle are not limited to the above examples. The typical metal oxide particle (minute particle) have an OH group on its surface. The metal oxide particle (minute particle) reacts with (meth) acrylate having the polyfunctional group. More specifically, the metal oxide particle (minute particle) is modified with the (meth)acrylate. Further, in addition to the (meth)acrylate having the polyfunctional group, metal oxide particle (minute particle) modified with (meth)acrylate having bifunctional group may be employed.

Examples of the fluorine-based resin include perfluoropolyether acrylate, perfluoropolyether methacrylate, fluorine-containing polysiloxane, and fluorine-containing and cyclic polysiloxane. As a matter of course, examples of the fluorine-based resin are not limited thereto.

The protection film-constituent material is available from, for example, NIDEK CO., LTD., JSR CORPORATION, Nitto Boseki Co., Ltd., DIC CORPORATION, etc. More specifically, Acier (ultraviolet-curing type organic-inorganic composite hard coating agent) produced by NIDEK CO., LTD., is exemplified as a preferable material. As a matter of course, the preferable protection film-constituent material is not limited to the "Acier".

The protection film obtained by curing the protection film-constituent material layer preferably has a contact angle (contact angle to oleic acid) equal to or greater than 40°. More preferably, the protection film has a contact angle (contact angle to oleic acid) equal to or greater than 60°. In other words, there is no specific limit in upper value. However, the preferable upper limit is a value at or below 80°.

The protection film obtained by curing the protection film-constituent material layer preferably has a contact angle (contact angle to water) equal to or greater than 70°. More preferably, the protection film has a contact angle (contact angle to water) equal to or greater than 80°. Further preferably, the protection film has a contact angle (contact angle to water) equal to or greater than 100°. There is no specific limit in upper value. However, the preferable upper limit is a value at or below 120°.

A preferable constituent material of the releasing layer (film) is ethylene tetrafluoro ethylene copolymer (ETFE). Alternatively, a preferable constituent material of the releasing layer is tetrafluoroetylene-hexafluoropropylen copolymer (FEP). The releasing layer may be also a polymer alloy containing the above described polymer.

Preferably, the resin layer (transparent resin layer (film)/insulative resin layer film) is made of one or more resin selected from the group consisting of, for example, acrylic resin, methacrylic resin, (e.g., polymethyl methacrylate (PMMA)), ester-based resin (e.g., polyethylene-telephthalate (PET) and polyethylene naphthalate (PEN)), cellulose resin (e.g., triacetylcellulose (TAC)), olefin resin (e.g., cycloolefin polymer (COP) and cyclic olefin copolymer (COC)), carbonate resin (e.g., polycarbonate (PC)), and ABS resin.

A second invention is directed to a method for manufacturing a molded article. In the method, the laminated film is subjected to molding in order to manufacture a molded article. The method includes a molding process. The molding process is a process for forming the laminated film into a predetermined shape (e.g., three-dimensional shape) by molding. The method includes a hardening treatment process. In the hardening treatment process, the protection film-constituent material layer is modified to a protection film (a hard protection layer (protection film)). The hardening treatment process is performed after the molding process. The hardening treatment process is, for example, a photo-irradiation process (e.g., an ultraviolet irradiation process). Alternatively, the hardening treatment process is a heating process. Which process is used as a hardening treatment process is determined according to components of the protection film-constituent material. In a case where the protection film-constituent material is the one cured by photo-irradiation, a photo-irradiation process is employed. In a case where the protection film-constituent material is the one cured by heating, a heating process is employed. The method includes a removal process. In the removal process, the releasing layer is removed. The removal process is performed, preferably, after the molding process.

A third invention is directed to a molded article. The molded article is obtained by the method for manufacturing a molded article.

A fourth invention is directed to a method for manufacturing a touch panel. In the method, the laminated film is subjected to molding, thereby manufacturing a touch panel. The method includes a molding process. In the molding process, the laminated film is formed into a predetermined shape by molding. The method includes a hardening treatment process. In the hardening treatment process, the protection film-constituent material layer is modified to a protection film (hard protection layer (hard protection film)). The hardening treatment process is performed, preferably, after the molding process. The hardening treatment process is, for example, a photo-irradiation process (e.g., ultraviolet irradiation process). Alternatively, the hardening treatment process is a heating process. Which hardening treatment process is employed is decided according to the components of the protection film-constituent material. In a case where the protection film-constituent material is the one which cures by photo-irradiation, a photo-irradiation process is employed. In a case where the protection film-constituent material is the one which cures by heating, a heating process is employed. The method includes a removal process. In the removal process, the releasing layer is removed. The removal process is performed, preferably, after the molding process.

Preferably, the method further includes a molding process for forming a wiring film by molding. The wiring film has a structure that a wire layer of a predetermined pattern is provided on a surface of an insulative transparent resin layer.

Preferably, the molding process includes a molding process A, a molding process B, and a molding process C. In the molding process A, the laminated film is formed by molding. In the molding process B, the wiring film is formed by molding. In the molding process C, a molded body obtained in the molding process A is formed into one piece with a molded body obtained in the molding process B.

There is a case where the laminated film is not formed independently from the wiring film in the molding process. For example, it is possible to form a composite film by laminating the laminated film and the wiring film together by molding.

The method for manufacturing a touch panel will be described below in the next embodiment. First, a wiring film is prepared. The wiring film (touch panel film) has the following structure. A plurality of first electrode rows arranged on at least one surface of a transparent electrical insulative resin film, the first electrode rows formed of a plurality of island-shaped electrodes being arranged in a first direction via inter-electrode wirings, are formed in a second direction approximately orthogonal to the first direction at designated intervals. A plurality of second electrode rows formed of a plurality of island-shaped electrodes arranged in the second direction via inter-electrode wirings is formed in the first direction at designated intervals. Ends of the plurality of first electrode rows and the plurality of second electrode rows are provided with the island-shaped electrodes, respectively. A lead wiring is connected to each of the island-shaped electrodes. The touch panel film having the above structure is initially preheated. Accordingly, there is obtained a box shaped touch panel film preforming body including a principal surface portion at a crossing position between the first direction and the second direction, at least two side surface portions which are approximately orthogonal to the first direction and continuous to the principal surface portion, and at least two side surface portions which are approximately orthogonal to the second direction and continuous to the principal surface portion, wherein the touch panel film preforming body includes therein a first hollow portion defined by the principal surface portion and at least four side surface portions. On the other hand, the laminated film is initially preheated. Alternatively, a laminated film made of the laminated film and a film (design film) laminated together is initially preheated. The design film is a film on which a design (characters, signs, drawings, etc.) is provided. Accordingly, a box shaped design film preforming body including the hollow portion defined by the at least four side surface portions and the principal surface portion can be obtained. The touch panel film preforming body is set in a first mold, and the design film preforming body is set in a second mold (positioned opposite to the first mold). An insert molding is performed to inject a transparent resin into a space between the touch panel film preforming body and the design film performing body. Accordingly, the touch panel film preforming body and the design film performing body are formed into one piece. This enables obtainment of a box shaped body (touch panel precursor) including a hollow portion having a shape similar to the first hollow portion. The touch panel precursor is exposed to light (e.g., ultra violet rays). This makes the protection film-constituent material layer being cured. As a result, a protection film is formed. Subsequent peeling-off of the releasing layer (releasable film) provides a touch panel of which protection film is exposed to the outside. In thus obtained touch panel, the plurality of first electrode rows and the plurality of second electrode rows are formed on the principal surface portion. When viewing from a direction perpendicular to a surface of the film made of the insulative transparent resin, the island-shaped electrodes of the first electrode rows and the island-shaped electrodes of the second electrode rows are separated from each other and are arranged alternatively, two-dimensionally into a lattice shape. A plurality of third electrode rows including a plurality of island-shaped electrodes connected via the inter-electrode wirings is arranged in a third direction approximately orthogonal to the first direction and the second direction. The plurality of third electrode rows are formed in at least one of the second direction in one or both of the two side surface portions approximately orthogonal to the first direction and the first direction in one side surface portion of the two side surface portions approximately orthogonal to the second direction. A principal surface input region of which position is designated on the principal surface portion by an electric conductive indicator is provided. Also, a side surface input region of which position is designated by the indicator is provided on at least one of the at least two side surface portions approximately orthogonal to the first direction and/or at least one of the at least two side surface portions approximately orthogonal to the second direction. At least the island-shaped electrodes and the inter-electrode wirings among the island-shaped electrodes, the inter-electrode wirings, and the lead wirings are formed into a net shape by using conductor thin lines.

A fifth invention is directed to a touch panel. The touch panel is obtained by the method for manufacturing a touch panel.

Preferably, the touch panel is an electrostatic capacitive type touch panel. The electrostatic capacitive type touch panel has a shape of a case body including a principal surface portion and side surface portions. The case body is molded by using the laminated film and the wiring film. The case body is provided with the protection film at least on its outer surface. The side surface portions are continuous to the principal surface portion. Each of the side surface portions is approximately orthogonal to the principal surface portion. For example, there are more than four side surface portions which are approximately orthogonal to the principal surface portion. At least one side surface portion among the side surface portions is approximately orthogonal to the first direction in the principal surface portion. At least one side surface portion among the side surface portions is approximately orthogonal to the second direction in the principal surface portion. The principal surface portion includes a principal surface input region. At least one side surface portion of the more than four side surface portions includes a side surface input region. The principal surface portion is provided with at least two first electrode rows and at least two second electrode rows. The at least two first electrode rows are provided at designated intervals. The at least two first electrode rows are provided along the first direction. The at least two second electrode rows are provided at designated intervals. The at least two second electrode rows are provided along the second direction. Each of the first electrode rows and the second electrode rows is composed of more than two island-shaped electrodes and the inter-electrode wirings electrically connected to the island-shaped electrodes. The side surface portion including the side surface input region is provided with one or more third electrode rows and one or more fourth electrode rows. The third electrode rows are arranged on an extension of the first electrode rows (and/or the second electrode rows). The fourth electrode rows are arranged along a direction of the second electrode rows (and/or the first electrode rows). One ends of the first lead wirings are electrically connected to ends of the first electrode rows or ends of the third electrode rows. The other ends of the first lead wirings are formed on a side surface portion which does not include the side surface input region. One ends of the second lead wirings are electrically connected to the ends of the second electrode rows and ends of the fourth electrode rows. The other ends of the second lead wirings are formed on a side surface portion which does not include the side surface input region. At least one of the first lead wirings and the second lead wirings pass through a ridgeline portion which is a boundary between side surface portions adjacent to each other.

Preferably, the first electrode rows are provided on one surface of the principal surface portion. Preferably, the second electrode rows are provided on the other surface of the principal surface portion. Preferably, the third electrode rows are provided on a surface where the electrode rows as origins of the third electrode rows are provided. Preferably, the fourth electrode rows are provided on a surface where the electrode rows along which the fourth electrode rows are arranged are provided.

The first electrode rows and the second electrode rows are provided on one surface of the principal surface portion. The electrically insulative spacers are interposed at crossings between the first electrode rows and the second electrode rows. The third electrode rows and the fourth electrode rows are provided on one surface of the side surface portion. The electrically insulative spacers are interposed at crossings between the third electrode rows and the fourth electrode rows.

Preferably, the lead wirings which pass through the ridge line portion are positioned on an inner surface of the case body.

A sixth invention is directed to a display device. The display device includes the touch panel.

A seventh invention is directed to an information processor. The information processor includes the display device.

More specific embodiments will be described below. However, the present invention is not limited to the following embodiments. In so far as the features of the present invention are not impaired, various modifications and applications will be encompassed within the scope of the present invention.

Embodiment (A)

Figure 2:
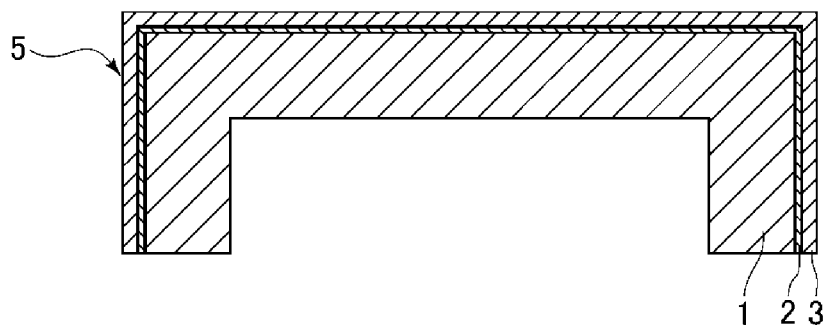
FIG. 2 is a cross sectional view of a laminated film shaped molded body.
Figure 3:
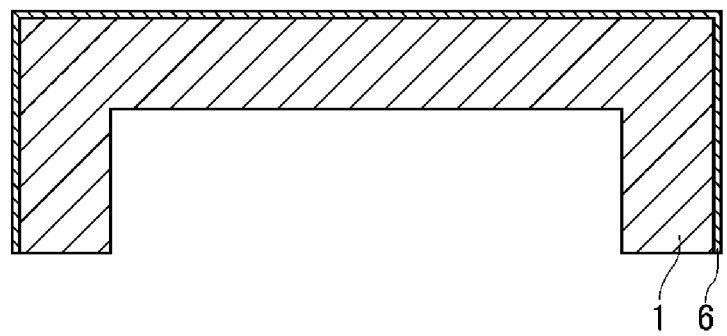
FIG. 3 is a cross sectional view of the molded body after peel-off of a releasable film.

An embodiment (A) of the present invention is illustrated in FIG. 1 to FIG. 3. FIG. 1 is a cross sectional view of a laminated film. FIG. 2 is a cross sectional view of a molded body obtained by forming a laminated film of FIG. 1 into a predetermined shape by molding. FIG. 3 is a cross sectional view of a molded body from which a releasable film has been peeled off.

In FIG. 1 to FIG. 3, 1 denotes a base material (resin film/transparent resin film/insulative transparent resin film). The base material 1 has a thickness of a range, for example, between 50 and 2000 μm. A preferable thickness of the base material 1 is of a range between 50 and 500 μm. It is sufficient for the base material 1 to have an insulation property equivalent to the insulation property required in the conventional touch panel. It is sufficient for the base material 1 to have transparency equivalent to the transparency required in the conventional touch panel. In the present embodiment, the film used here is a PMMA film (Technolloy™ S001G#125, having a thickness of 125 μm, manufactured by Sumitomo Chemical Company).

2 denotes a protection film constituting-material film. The protection film constituting-material film 2 has a thickness of a range between 1 and 100 μm. A preferable thickness of the protection film constituting-material film 2 was of a range between 1 and 30 μm. The protection film constituting-material film 2 is cured by hardening treatment (e.g., heating and/or photo-irradiation). Thus cured film is a protection film. In a process of FIG. 1, the hardening treatment has not been performed yet. Application of a coating containing a protection film-constituent material (e.g., resin material) to a surface of the film 1 formed the protection film constituting-material film 2. Any coating method can be employed, as required, for example, from meyer bar coating, bar coater coating, air knife coating, gravure coating, offset printing, flexo printing, and screen printing. After the application, drying treatment (e.g., hot-air drying at a temperature of 80° C. for 1 minute) was performed. The protection film constituting-material film 2 was dried and solidified but was not subjected to hardening treatment. Since the protection film constituting-material film 2 has not been subjected to the hardening treatment, the protection film constituting-material film 2 was still uncured. Even if the protection film constituting-material film 2 would have been cured under natural conditions, the protection film constituting-material film 2 had not been in a completely cured state. In this case, the protection film constituting-material film 2 was in a semi-cured state at the most. The protection film constituting-material film 2 which is not completely cured is relatively soft. Therefore, the base material 1 provided with the protection film constituting-material film 2 can be rolled up. A film (cured film/protection film) obtained by causing the protection film constituting-material film 2 to be subjected to hardening treatment is a fluorine-based resin film. In the present embodiment, a thickness of the protection film constituting-material film 2 was 9 μm. In the present embodiment, the protection film constituting-material film 2 was an ultra violet irradiation curable type film. For example, the protection film constituting-material film 2 was of a type of film being cured as the polymerization reaction by ultraviolet irradiation improved.

3 denotes a releasable film. The releasable film 3 has a thickness of a range between, for example, 5 and 50 μm. The releasable film 3 was provided on a surface of the protection film constituting-material film 2 before the protection film constituting-material film 2 was dried and solidified. A roll laminator was used for lamination. This enabled the releasable film 3 to closely cover the protection film constituting-material film 2. The releasable film 3 is a fluorine-based resin film. The releasable film 3 can be formed by applying a fluorine-based resin containing-coating to a film surface (a surface touching the protection film constituting-material film 2). For example, the releasable film 3 may be formed by applying a FEP containing coating or an ETFE containing coating. In this case, the protection film-constituent material and the FEP containing coating (ETFE containing coating) may be formed by a simultaneous multilayer-lamination application method. Even with the simultaneous multilayer-lamination application method, strictly speaking, the protection film constituting-material film (lower layer) 2 is formed prior to the releasable film (upper layer) 3 for sure.

In a case where the fluorine-based resin containing-coating is applied to the releasable film, the film itself is not necessarily being composed of a fluorine-based resin film. In this case, a resin film publicly known as a releasable film can be used. For example, a film made of materials used in the above mentioned resin layer (transparent resin layer, insulative resin layer) can be used.

4 denotes a laminated film. The laminated film 4 is a laminated material composed of the film 1, the protection film constituting-material film 2, and the releasable film 3.

The laminated film 4 was formed by molding (by, for example, heat-molding).

After formation of the laminated film 4, a molded article (see, FIG. 2) 5 was taken out from a mold.

Thus taken out molded article 5 was subjected to ultraviolet irradiation. An ultraviolet irradiation apparatus used here was a "Light Hammer (H valve)" manufactured by Fusion UV Systems, Japan. The accumulative light intensity of ultraviolet irradiation was 900 mJ/cm$^2$. Accordingly, the protection film constituting-material film 2 was completely cured. In other words, the protection film constituting-material film 2 was modified to be a cured film (protection film) 6.

Subsequently, the releasable film 3 was peeled off (see, FIG. 3).

After the peeling-off of the releasable film 3, features of the resulting product were checked. A result thereof is shown in Table-1.

In Table-1, in the laminated film 4 of example 1, a hard coating agent (Acier™ produced by NIDEK CO., LTD.) composing the fluorine-based resin was employed for the protection film constituting-material film 2, and an ethylene tetrafluoro ethylene copolymer (ETFE) film (AFLEX™ 12N, having a thickness of 12 μm, produced by ASAHI GLASS CO., LTD.) was employed for the releasable film 3.

In the laminated film 4 of example 2, materials identical to those of example 1 were employed, except that a thickness of the releasable film (ETFE film) 3 was 25 μm.

In the laminated film 4 of example 3, materials identical to those of example 1 were employed, except that a thickness of the releasable film (ETFE film) 3 was 50 μm.

In the laminated film 4 of example 4, materials identical to those of example 1 were employed, except that a tetrafluoroetylene-hexafluoropropylen copolymer (FEP) film (TOYOFLON™12FLS, having a thickness of 12.5 μm, produced by TORAY INDUSTRIES, INC.) was employed for the releasable film 3.

In the laminated film 4 of example 5, materials identical to those of example 2 were employed, except that a hard coating agent (RL-1563 produced by SANYU REC CO., LTD.) composing fluorine-based resin was employed for the protection film constituting-material film 2.

In the laminated film 4 of example 6, materials identical to those of example 1 were employed, except that a film obtained by applying releasable agent (containing a perfluoro group) to a PET (PET100SG-2 produced by PANAC Corporation) film was employed for the releasable film 3.

In the laminated film 4 of example 7, materials identical to those of example 1 were employed, except that a film obtained by applying releasable agent (fluoroethylene-vinyl ether-based) to a PET (PET100SG-2 produced by PANAC Corporation) film was employed for the releasable film 3.

In the laminated film 4 of comparison example 1, materials identical to those of example 1 were employed, except that the releasable film 3 was not provided. Before molding, the protection film constituting-material film 2 was subjected to ultraviolet irradiation, instead, to be formed into a completely cured film.

In the laminated film 4 of comparison example 2, materials identical to those of example 1 were employed, except that the releasable film 3 was a PET film (Lumilar™25T60, having a thickness of 25 μm, produced by TORAY INDUSTRIES, INC.).

In the laminated film 4 of comparison example 3, materials identical to those of example 1 were employed, except that the releasable film 3 was a polymethylpentene (PMP) film (Opyuran™50X44B, having a thickness of 50 μm, produced by Mitsui Chemicals, Inc.).

In the laminated film 4 of comparison example 4, materials identical to those of example 1 were employed, except that the releasable film 3 was a polypropylene (PP) film (Torayfan™40BO2500, having a thickness of 40 μm, produced by TORAY INDUSTRIES, INC.).

In the laminated film 4 of comparison example 5, materials identical to those of example 7 were employed, except that no releasable film 3 was provided. Before molding, the protection film constituting-material film 2 was subjected to ultraviolet irradiation, instead, to be completely cured.

In the laminated film 4 of comparison example 6, materials identical to those of example 7 were employed, except that the releasable film 3 was a polymethylpentene (PMP) film (Opyuran™50X44B, having a thickness of 50 μm, produced by Mitsui Chemicals, Inc.).

How to evaluate features (items to be evaluated) of Table-1 is described below.

[Contact Angle (Contact Angle to Purified Water and Contact Angle to Oleic Acid)]

Purified water (or oleic acid) was dropped (by dropping amount of 2.0 μl) on a surface of a protection film (completely cured film). A contact angle to purified water (or oleic acid) was measured. "CA-VE Type Automatic Contact Angle Meter (manufactured by Kyowa Interface Science Co., LTD.) was used for the measurement of contact angle. Room temperature at the time of measurement was in a range between 20° C. and 25° C. Humidity at the time of measurement was in a range between 20 and 60% RH. (1/2) θ Method was employed for measurement. Stain-proof performance of protection film was evaluated by using the contact angle. An oleic acid is considered as oil composition of a finger print, and a contact angle to the oleic acid is regarded as a lipophilic parameter.

It is desirable that a surface of the protection film has water repellency and oil repellency. It is further desirable that both of a contact angle to water and a contact angle to oleic acid show high angles. Preferable contact angle to water is a value equal to or greater than 70°. Preferable contact angle to oleic acid is a value equal to or greater than 40°. With such degree of values, both of aqueous stain and oleic stain hardly stick to the surface of the protection film.

[Sticking Resistance of Solvent Ink (Wiping Easiness of Solvent Ink)]

Here, a degree of oil soluble stain resistance (removal easiness of the sticking oil soluble stain) is evaluated in this item. That is, stain resistance of the protection film is evaluated.

An oily magic pen (Mackie Care™, superfine (red) manufactured by ZEBRA CO., LTD.) was employed. Writing was performed on a surface of the protection film by the oily magic pen.

A case where ink was strongly repelled to form a water drop and thus could be readily wiped out was indicated by "◉".

A case where ink was repelled and thus could be readily wiped out was indicated by "○".

A case where ink was not repelled but could be wiped out was indicated by "△".

A case where ink could not be wiped out was indicated by "x".

[Pencil Hardness of Protection Film]

A pencil hardness of completely hardened protection film was checked according to JIS-K5600-5-4 (scratch hardness (Pencil Method)).

[Scratch Resistance of Protection Film]

Gakushin friction fastness tester "AB-301" (manufactured by TESTER SANGYO CO., LTD.) and a friction block (steel wool of #0000) were employed. While a load of 1000 g was applied to a surface of the protection film, a to-and-fro motion was repeated for 10 times at 120 mm/s (speed) for 120 mm (distance).

A case where no scratch was made was indicated by "◉".

A case where 1 to 3 scratches were made was indicated by "△".

A case where more than 11 scratches were made was indicated by "x".

[Vacuum Molding Property]

In a case where the laminated film 4 was subjected to vacuum forming (heating at a temperature of 400° C. for 20 seconds), if the laminated film 4 could be formed into a deep drawing shape, it was indicated by "◉";

if the laminated film 4 could be formed into a shallow drawing shape, it was indicated by "○";

if the laminated film 4 was formed into a mere simple curving shape, it was indicated by "△"; and if the laminated film 4 was broken to fail to obtain a resulting product, it was indicated by "x".

TABLE 1

| | contact angle (°) | | solvent ink | pencil | wear-resistance | | total |
|---|---|---|---|---|---|---|---|
| | water | oleic acid | sticking resistance | hardness | feature | moldability | evaluation |
| example 1 | 103.0 | 60.4 | ◉ | 4H | ◉ | ◉ | ◉ |
| example 2 | 103.8 | 61.6 | ◉ | 4H | ◉ | ◉ | ◉ |
| example 3 | 104.4 | 62.0 | ◉ | 4H | ◉ | ◉ | ◉ |
| example 4 | 107.2 | 73.0 | ◉ | 4H | ◉ | ◉ | ◉ |
| example 5 | 116.6 | 72.6 | ◉ | 3H | △ | ◉ | ○ |
| example 6 | 97.8 | 54.6 | ○ | 4H | ○ | ○ | ○ |
| example 7 | 100.2 | 48.2 | ○ | 3H | ○ | ○ | ○ |
| comparison example 1 | 106.6 | 67.2 | ◉ | 3H | ◉ | X | X |
| comparison example 2 | 70.2 | 19.8 | X | 3H | △ | ○ | X |
| comparison example 3 | 100.2 | 51.8 | X | — | — | ◉ | X |
| comparison example 4 | 104.8 | 18.4 | X | 2H | — | ○ | X |
| comparison example 5 | 112.4 | 72.8 | ◉ | 2H | △ | X | X |
| comparison example 6 | 105.4 | 54.2 | X | 2H | X | ◉ | X |

Table-1 shows that a feature of the cured film (protection film) 6 differs largely according to a combination of the protection film constituting-material film 2 and the releasable film 3. Table-1 shows excellent moldability in a case where a ETFE film or a FEP film is employed as the releasable film 3 with respect to the protection film constituting-material film 2. Further, Table-1 shows that contaminant such as oil hardly sticks to the protection film. Table-1 further shows that the contaminant can be removed with ease even if contaminant sticks to the protection film. In other words, Table-1 shows that the protection film is excellent in contamination resistance. Table-1 still further shows that the protection film is hardly scratched since it is hard.

A resin without containing fluorine (PET, PP, PMP, etc.) is not desirable to be employed as the releasable film 3 since stain resistance does not appear. According to the embodiment of the present invention, while placing the protection film constituting-material film 2 in a state of being not polymerized or cured completely, the surface of the film 2 was covered with the releasable film 3 (laminating film), and subsequently, the protection film constituting-material film 2 covered by the releasable film 3 was completely cured (polymerized and cured). If it was desired to cause the protection film 6 to have a preferable feature (e.g., mechanical properties (pencil hardness, scratch resistance, etc.) and antifouling property (water repellency and oil repellency)), it was needed to cause the F (fluorine) for generating stain resistance to exist on the surface of the protection film 6 after the removal of the releasable film 3. Therefore, it was known that existence of F in the releasable film 3 was essential.

In each example, in order to enhance affinity between the protection film constituting-material film 2 and the releasable film 3 and to cause F to exist in the protection film constituting-material film 2, a releasable film containing F is employed. This enables simultaneous appearance of mechanical properties and antifouling property.

When compared with PP having a SP value (solubility parameter: $\delta$) of 8.1, PET having a SP value of $\delta \approx 11$, poly(vinylidene fluoride) having a SP value of $\delta \approx 11$, PTFE having a SP value of $\delta \approx 6.2$, FEP having a SP value of $\delta \approx 6.5$, and ETFE having a SP value of $\delta \approx 7.1$, it is considered that a fluorine-based resin having a SP value of $6.5 \leq \delta \leq 7.1$ is suitable as the releasable film 3.

Embodiment (B)

Figure 4:
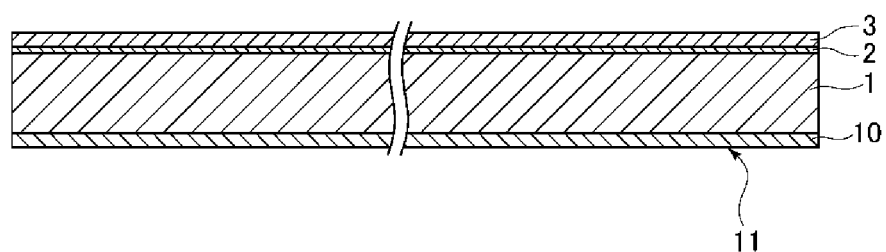
FIG. 4 is a cross sectional view of the laminated film.
Figure 5:
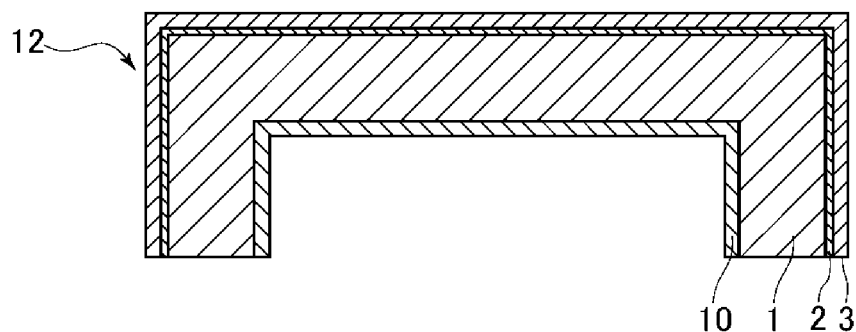
FIG. 5 is a cross sectional view of the laminated film shaped molded body.
Figure 6:
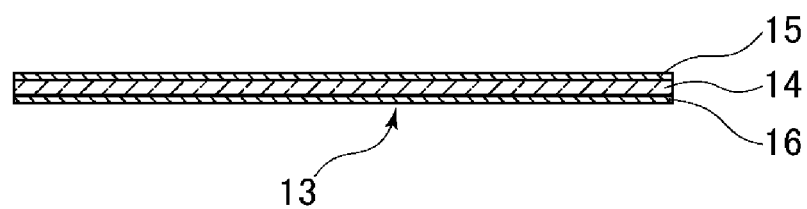
FIG. 6 is a cross sectional view of a wiring film (touch panel film).
Figure 7:
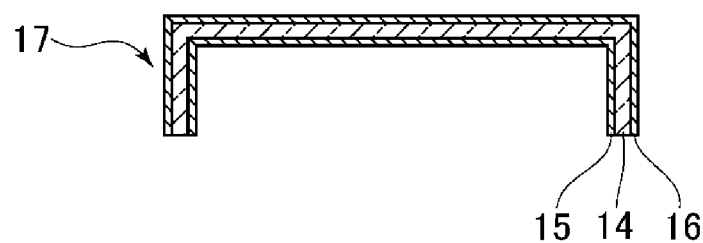
FIG. 7 is a cross sectional view of a wiring film shaped molded body.
Figure 8:
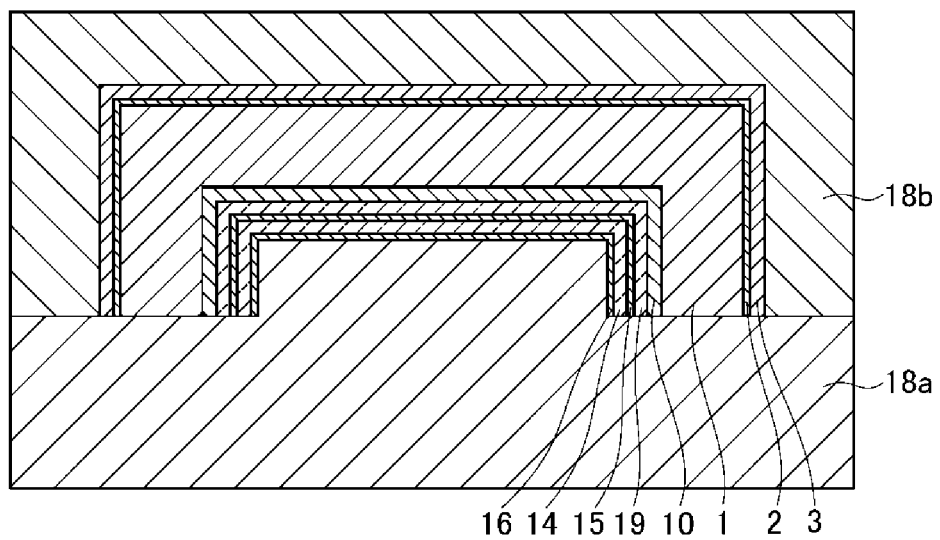
FIG. 8 illustrates a state of an insert-molding.
Figure 9:
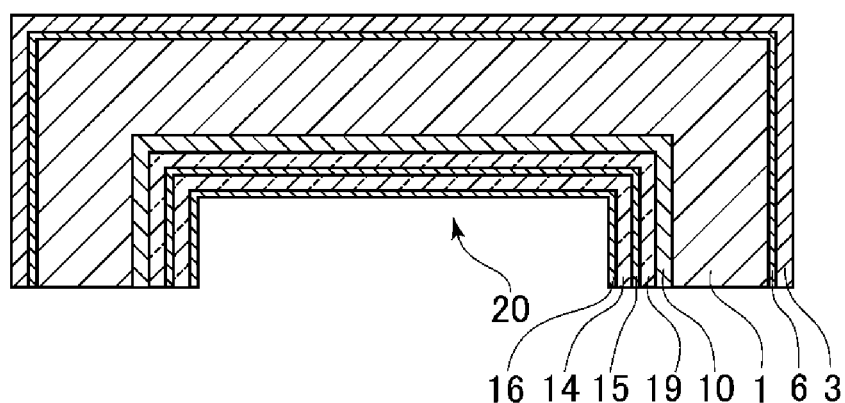
FIG. 9 is a cross sectional view of a molded body (touch panel precursor) obtained by insert molding.
Figure 10:
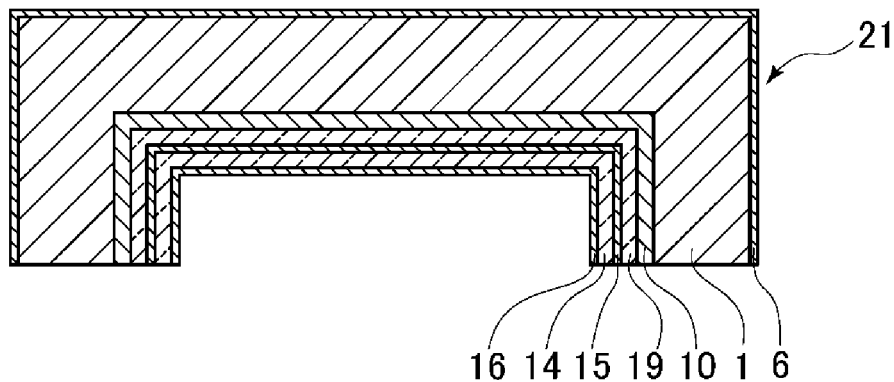
FIG. 10 is a cross sectional view of a touch panel.
Figure 11:
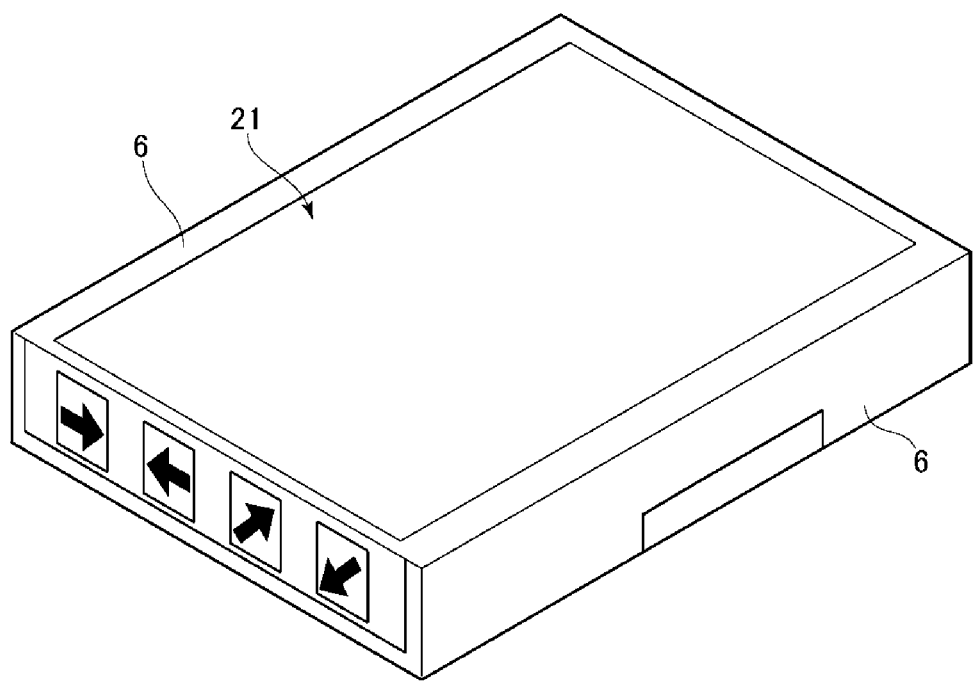
FIG. 11 is a perspective view of the touch panel.

An embodiment (B) is illustrated in FIG. 4 to FIG. 11. FIG. 4 is a cross sectional view of a laminated film (in some cases, it is referred to as a design film) obtained by laminating a design film on the laminated film of FIG. 1. FIG. 5 is a cross sectional view of a molded body obtained by forming the laminated film of FIG. 4 into a predetermined shape by molding. FIG. 6 is a cross sectional view of a wiring film (touch panel film). FIG. 7 is a cross sectional view of a molded body obtained by forming a wiring film (touch panel film) into a predetermined shape by molding. FIG. 8 is a cross sectional view illustrating a state of a molding process in which the molded body of FIG. 5 and the molded body of FIG. 7 are formed into one piece. FIG. 9 is a cross sectional view of a molded body (touch panel precursor) taken out from a mold. FIG. 9 illustrates a state of ultraviolet irradiation (hardening treatment of a protection film constituting-material film). FIG. 10 is a cross sectional view of a touch panel from which the releasable film 3 has been peeled off. FIG. 11 is a perspective view of a touch panel.

The laminated film of FIG. 4 corresponds to those of examples 1 to 7 in the first embodiment.

10 denotes a design film. The design film 10 is laminated on the other side (a side where the protection film constituting-material film 2 is not provided) of the base material (resin film/transparent resin film/insulative transparent resin film) 1.

The laminated film 11 of FIG. 4 was formed by molding (by heat-molding or, in some cases, vacuum forming, pneumatic molding, or press molding is performed simultaneously with the heat-molding). Reference characters 1 to 6 means components identical to those of the embodiment (A). A design film molded body 12 was obtained by molding (see, FIG. 5).

The design film molded body 12 includes four side surface portions having a design print layer (decorative film) formed at a peripheral region and a principal surface portion where no design print layer (decorative film) is formed, and defines a hollow portion by the four side surface portions and the principal surface portion. The design film molded body 12 has a case shape (box shape).

13 denotes a wiring film (touch panel film). 14 denotes an insulative transparent resin layer (film). The above exemplified resins are used, as required. Specifically, a stretchable resin is employed. Examples of the stretchable resin include PET and PMMA. The film 14 has a thickness of a range, for example, between 10 and 500 µm. Preferable thickness of the film 14 is in a range between 50 and 300 µm. Wirings 15 and 16, each having a predetermined pattern, are formed on both of a front surface and a rear surface (an upper surface and a lower surface) of the film 14 in each corresponding manner. The patterns of the wirings 15 and 16 are as described above. An electrostatic capacity can be detected via the wirings 15 and 16. The wiring film 13 can be produced by using a transparent electric conductive film "Exclear™" (produced by FUJIFILM Holdings Corporation) applied with, for example, optical silver halide photography technology. Each wiring is made of conductor thin line. Each wiring is composed of, for example, net-shaped electrode, inter-electrode wiring, lead wiring, etc. The wirings 15 and 16 may be formed with a transparent electric conductive material such as ITO and carbon nanotube. Meanwhile, a design film similar to the design film 10 may be laminated with the wirings 15 and 16.

A wiring film 13 (see, FIG. 6) was formed by molding (by heat-molding or, in some cases, vacuum forming, pneumatic molding, or press molding is performed simultaneously with the heat-molding). Accordingly, a touch panel film-shaped molded body 17 (see, FIG. 7) was obtained. The touch panel film molded body 17 has a shape similar to that of the design film molded body 12.

The design film molded body 12 (see, FIG. 5) and the touch panel film molded body 17 (see, FIG. 7) were used to form a touch panel precursor by insert molding. The touch panel film molded body 17 was set in a convex mold 18a. The design film molded body 12 was set in a concave mold 18b. The convex mold 18a and the concave mold 18b were matched (closed). Subsequently, a fluidized resin material for molding (transparent resin 19) was injected into a space between the design film molded body 12 and the touch panel film molded body 17. After cooling, the mold was opened. Then, a molded body obtained by insert molding (a molded body obtained by integrating the design film molded body 12 and the touch panel film molded body 17/touch panel precursor) 20 (see, FIG. 9) was taken out. Subsequently, thus taken out integrated molded body was subjected to ultraviolet irradiation (see, FIG. 9). Accordingly, the protection film constituting-material film 2 was completely cured and modified to be the cured film (protection film) 6. Then, the releasable film 3 was peeled off. This causes the protection film 6 to be exposed to the outside. As a result, a touch panel 21 was obtained (see, FIG. 10 and FIG. 11).

REFERENCE CHARACTER LIST

1 base material (resin film)
2 protection film constituting-material film
3 releasable film
4 laminated film
5 molded article
6 cured film (protection film)
10 design film
11 laminated film
12 design film molded body
13 wiring film (touch panel film)
14 insulative transparent resin layer (film)
15, 16 wiring
17 touch panel film molded body
18a convex mold
18b concave mold
20 molded body obtained by insert molding (touch panel precursor)
21 touch panel

The invention claimed is:

1. A method for manufacturing a touch panel by molding a laminated film:
   wherein the laminated film comprises
      a resin layer,
      a protection film-constituent material layer provided on a surface of the resin layer, and
      a releasing layer provided on a surface of the protection film-constituent material layer;
   wherein the resin layer, the protection film-constituent material layer, and the releasing layer are laminated together;
   wherein the protection film-constituent material layer is an uncured layer which is not completely cured, in the course of a molding process;
   the method comprising:
      a molding process for forming the laminated film into a predetermined shape,
      a hardening treatment process for providing hardening treatment to the protection film-constituent material layer after the molding process and getting the protection film-constituent material layer modified to be a protection layer, and
      a removal process for removing the releasing layer after the molding process;
   wherein the protection film-constituent material layer is a layer containing fluorine-based substances; and
   wherein the releasing layer is a layer made by using a fluorine-based resin.

2. The method for manufacturing a touch panel according to claim 1, further comprising a second molding process of forming a wiring film on a surface of an insulative transparent resin layer by molding, the wiring film being provided with a wiring layer of a predetermined pattern.

3. The method for manufacturing a touch panel according to claim 2, wherein:
   the molding process for forming the laminated film is a first molding process A for forming the laminated film by molding;
   the second molding process for forming a wiring film is a second molding process B for forming the wiring film by molding; and
   a third molding process C integrates the molded laminated film body obtained in the molding process A with the molded wiring film body obtained in the molding process B.

4. The method for manufacturing a touch panel according to claim 2, wherein the laminated film and the wiring film define a composite film formed by molding.

5. The method for manufacturing a touch panel according to claim 1, wherein the protection film-constituent material layer contains a composition curable by hardening treatment.

6. The method for manufacturing a touch panel according to claim 1, wherein the protection film-constituent material layer contains a fluorine-based substance and a composition curable by hardening treatment.

7. The method for manufacturing a touch panel according to claim 1, wherein the protection layer has a contact angle to oleic acid equal to or greater than 40°.

8. The method for manufacturing a touch panel according to claim 1, wherein the protection layer has a contact angle to water equal to or greater than 70°.

9. The method for manufacturing a touch panel according to claim 1, wherein the releasing layer is composed of ethylene tetrafluoro ethylene copolymer and/or tetrafluoroetylene-hexafluoropropylen copolymer.

10. The method for manufacturing a touch panel according to claim 1, wherein the resin layer is composed of one or more resins selected from the group consisting of acrylic resin, methacrylic resin, ester-based resin, cellulose-based resin, olefin-based resin, carbonate-based resin, and ABS resin.

11. The method for manufacturing a touch panel according to claim 1, wherein the removal process is performed after the hardening treatment process.

12. The method for manufacturing a touch panel according to claim 2:
   wherein the touch panel is an electrostatic capacitive touch panel comprising the laminated film and the wiring film;
   wherein the touch panel comprises a case body formed of an electrically insulative transparent resin film;
   wherein the case body comprises a principal surface portion and side surface portions;
   wherein the principal surface portion comprises a principal surface input region;
   wherein at least one of the side surface portions comprises a side surface input region;
   wherein the principal surface portion is provided with the wiring film comprising at least two first electrode rows and at least two second electrode rows;
   wherein the at least two first electrode rows are arranged in a first direction at predetermined distances;
   wherein the at least two second electrode rows are arranged in a second direction at predetermined distances;
   wherein each of the first electrode rows and each of the second electrode rows comprises at least two island-shaped electrodes and inter-electrode wirings electrically connecting the island-shaped electrodes;
   wherein side surface portion comprising the side surface input region is provided with the wiring film comprising one or more third electrode rows and one or more fourth electrode rows;
   wherein the third electrode rows are arranged on an extension of the first electrode rows (and/or the second electrode rows),
   wherein the fourth electrode rows are provided in a direction of the second electrode rows (and/or the first electrode rows);
   wherein ends of the first electrode rows or ends of the third electrode rows are electrically connected to one ends of first lead wirings in each corresponding manner;
   wherein the other ends of the first lead wirings are formed on a side surface portion without having the side surface input region;
   wherein ends of the second electrode rows and ends of the fourth electrode rows are electrically connected to one ends of second leading wirings in each corresponding manner;
   wherein the other ends of the second lead wirings are formed on the side surface portion without having the side surface input region; and
   wherein at least one of the first lead wirings and the second lead wirings pass through a ridgeline portion as a boundary between the neighboring side surface portions.

13. The method for manufacturing a touch panel according to claim 12:
   wherein the first electrode rows are provided on one surface of the principal surface portion;

wherein the second electrode rows are provided on the other surface of the principal surface portion;

wherein the third electrode rows are provided on a surface where the electrode rows as origins of the third electrode rows are provided; and wherein the fourth electrode rows are provided on a surface where the electrode rows along which the fourth electrode rows are arranged are provided.

14. The method for manufacturing a touch panel according to claim 12:

wherein the lead wirings passing through the ridgeline portion are arranged on the inside surface of the case body.

15. A method for manufacturing a molded article by molding a laminated film:

wherein the laminated film comprises
a resin layer,
a protection film-constituent material layer formed on a surface of the resin layer, and
a releasing layer formed on a surface of the protection film-constituent material layer;

wherein the resin layer, the protection film-constituent material layer, and the releasing layer are laminated together;

wherein the protection film-constituent material layer is an uncured layer which is not completely cured in the process of molding;

the method comprising:
a molding process for forming the laminated film into a predetermined shape;
a hardening treatment process for providing hardening treatment to the protection film-constituent material layer after the molding process and getting the protection film-constituent material layer modified to be a protection layer; and
a removal process for removing the releasing layer after the molding process;

wherein the protection film-constituent material layer contains fluorine-based substances, and wherein the releasing layer is made by using a fluorine-based resin.

16. The method for manufacturing a molded article according to claim 15, wherein the protection film-constituent material layer contains composition curable by hardening treatment.

17. The method for manufacturing a molded article according to claim 15, wherein the protection film-constituent material layer contains fluorine-based substances and composition curable by hardening treatment.

18. The method for manufacturing a molded article according to claim 15, wherein the removal process is performed after hardening treatment process.

* * * * *